United States Patent Office 3,574,762
Patented Apr. 13, 1971

3,574,762
PROCESS FOR PREPARING NAPHTHALENONES
Wataru Nagata, Nishinomiya-shi, Hyogo, Tadao Terasawa, Takatsuki-shi, Osaka, and Tsutomu Sugasawa, Kobe-shi, Hyogo, Japan, assignors to Shionogi & Co., Ltd., Osaka, Japan
No Drawing. Filed July 7, 1967, Ser. No. 651,699
Claims priority, application Japan, July 9, 1966, 41/45,016
Int. Cl. C07c 49/76, 49/80, 149/82
U.S. Cl. 260—590         7 Claims

ABSTRACT OF THE DISCLOSURE

Process for the preparation of naphthalene derivatives, useful as intermediates in the preparation of phenanthrene derivatives having a potent antiandrogenic activity, and of steriod hormone, which is characterized by the epoxidation of a substituted or not substituted dihydronaphthalene derivative with an organic peracid in the reaction medium containing a lower alkanol and the subsequent elimination of an alcohol yielding a corresponding 2-tetralone derivative.

---

The present invention relates to a process for preparing naphthalene derivatives, useful as intermediates in the preparation of phenanthrene derivatives having potent antiandrogenic activity, and of steroid hormones valuable as medicaments. More particularly, the invention relates to an improved process for preparing a 2-tetralone derivative represented by the general Formula II (wherein $R^1$ is a member selected from the group consisting of hydrogen atom and hydrocarbon group containing from 1 to 7 carbon atoms; $R^2$, $R^3$, $R^4$ and $R^5$ each is a member selected from the group consisting of hydrogen atom, hydrocarbon group containing from 1 to 7 carbon atoms, hydroxy group, alkoxy group containing from 1 to 7 carbon atoms, and halogen atom) from a dihydronaphtalene derivative represented by the general Formula I (wherein $R^1$, $R^2$, $R^3$, $R^4$ and $R^5$ each has the same significance as designated above).

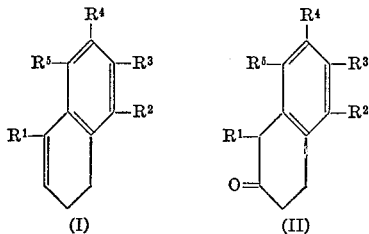

With respect to the similar reactions, the following have previously been reported: Peracid oxidation and subsequent acid elimination of 6 - methoxy-3,4-dihydronaphthalene (I: $R^1=R^2=R^4=R^5=H$, $R^3=OCH_3$) afford 6 - methoxy - 1,2,3,4 - tetrahydronaphthalen-2-one (II: $R^1=R^2=R^4=R^5=H$, $R^3=OCH_3$) below 73.5% yield (crude) (W. Salzer: Z. Physiol. Chem., 274, 39 (1942); W. Nagata et al., Chem. Pharm. Bull. (Tokyo), 9, 267 (1961)). In the similar manner, 6-methoxy-1-methyl-3,4-dihydronaphthalene (I: $R^1=CH_3$, $R^3=OCH_3$, $$R^2=R^4=R^5=H)$$

affords 6-methoxy-1-methyl-1,2,3,4-tetrahydronaphthalen-2-one (II: $R^1=CH_3$, $R^3=OCH_3$, $R^2=R^4=R^5=H$) in 46–55% yield (crude) D. A. H. Taylor, J. Chem. Soc., 1958, 1248; G. Stork, J. Am. Chem. Soc., 85, 3419 (1963)). Similarly, 1 - ethyl - 5 - chloro-7,8-dimethoxy-1,2,3,4 - tetrahydronaphthalen - 2 - one (II: $R^1=C_2H_5$, $R^2=Cl$, $R^3=H$, $R^4=R^5=OCH_3$) is produced from 1-ethyl-5-chloro - 7,8 - dimethoxy-3,4-dihydronaphthalene (I: $R^1=C_2H_5$, $R^2=Cl$, $R^3=H$, $R^4=R^5=OCH_3$) in 33% yield (R. Robinson et al., J. Chem. Soc., 1944, 506); 1-methyl - 5 - hydroxy-8-methoxy - 1,2,3,4 - tetrahydronaphthalen-2-one (II: $R^1=CH_3$, $R^2=OH$, $R^3=R^4=H$, $R^5=OCH_3$) from 1 - methyl - 5 - hydroxy - 8 - methoxy-3,4 - dihydronaphthalene (I: $R^1=CH_3$, $R^2=OH$, $R^3=R^4=H$, $R^5=OCH_3$) in 33% yield (W. F. Newhall et al., J. Am. Chem. Soc., 77, 5646 (1955)); and 1,6-dimethyl - 7 - methoxy - 1,2,3,4 - tetrahydronaphthalen-2-one (II: $R^1=R^3=CH_3$, $R^2=R^5=H$, $R^4=OCH_3$) from 1,6 - dimethyl - 7 - methoxy - 3,4 - dihydronaphthalene (I: $R^1=R^3=CH_3$, $R^2=R^5=H$, $R^4=OCH_3$) in 68.4% yield (P. C. Dutta et al., J. Chem. Soc., 1960, 4766). Moreover, in the studies of the present inventors several tetrahydronaphthalen - 2 - ones (II: $R^1=C_2H_5$, $C_3H_7$, i-$C_3H_7$, $C_4H_9$, $C_3H_5$, $C_6H_5$, $R^2=R^4=R^5=H$, $R^3=OCH_3$) could be prepared from corresponding dihydronaphthalenes (I: wherein $R^1$, $R^2$, $R^3$, $R^4$ and $R^5$ each is defined above) in the same procedure in 47% yield or below.

In view of the industrial importance of these synthetic methods, the present inventors had attempted various alternations intending to improve the yield, however, the purpose could not easily be attained. It has now been discovered that an addition of methanol or other lower alkanol into the solvent produces good results. The present invention has been accomplished on the basis of the studies of the reaction mechanism in regard to this effect. The process of the present invention comprises oxidizing a dihydronaphthalene derivative represented by the Formula I (where $R^1$ is a member selected from the group consisting of hydrogen atom and hydrocarbon group containing from 1 to 7 carbon atoms; $R^2$, $R^3$, $R^4$ and $R^5$ each is a member selected from the group consisting of a hydrogen atom, a hydrocarbon group containing from 1 to 7 carbon atoms, a hydroxy group, an alkoxy group containing from 1 to 7 carbon atoms, and a halogen atom) with a peracid in the reaction medium containing a lower alkanol and then eliminating an alcohol molecule to yield a 2-tetralone derivative represented by the Formula II (wherein $R^1$, $R^2$, $R^3$, $R^4$ and $R^5$ each has the same significance as designated above).

The conversion of compound I to compound II has, heretofore, been carried out by epoxidizing the compound I with a peracid such as peracetic acid, perbenzoic acid or monoperphthalic acid in an inert solvent such as chloroform, and then, without separation of the intermediate, treating with an acid or distilling at reduced pressure in the presence of a catalyst. The reaction mechanism in this case had been considered that an intermediate III, as shown in the reaction scheme, rearranges on acid treatment or distillation under heating, via III', to yield II. However, as a result of detailed studies, the present inventors have recognized that the addition of a carboxylic acid corresponding to the peracid used into $C_1$-carbonium ion affords IV (wherein $R^6COO^-$ is an acid residue derived from peracid), in which the elimination of carboxylic acid, on acid treatment or distillation at reduced pressure, occurs to yield II. But, in the reexamination for the improvement in yield, it has been found that the said adduct of carboxylic acid is relatively unstable, and consequently the contamination accompanied by oxidation reaction or by the procedure of after-treatment markedly reduces the yield.

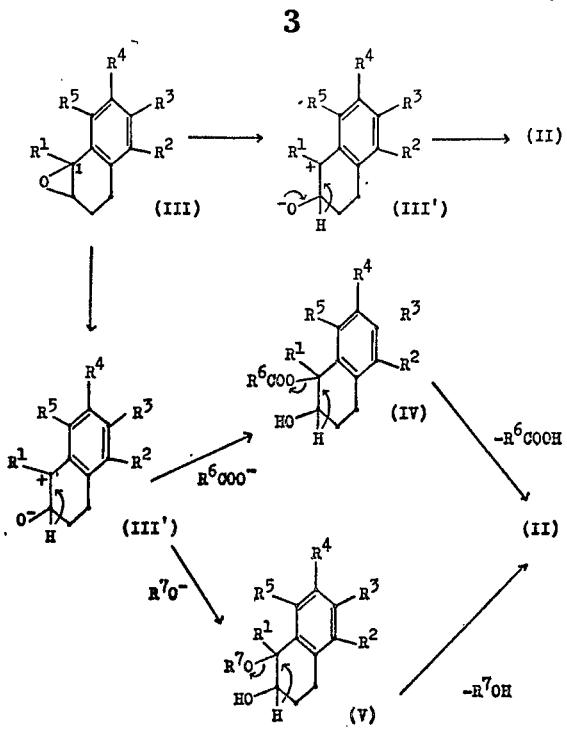

On the contrary, it has been confirmed that, when a large amount of alcohol is present in the reaction medium, as in the present invention, a small amount of carboxylic acid derived from peracid and the alcohol competitively add to the carbonium ion produced at the stage of peracid oxidation, and, at this time, since an alkoxide ion is more active in nucleophilicity, almost all of III′ is obtainable as a relatively stable ether derivative V (wherein $R^7O^-$ is an alkoxide ion derived from an alcohol), which is not contaminated at the stage of oxidation or after-treatment, consequently the improvement in yield may be achieved.

The starting compound (I) of this invention can be obtained by reacting the 1,2,3,4-tetrahydronaphthalen-1-one with an alkylmagnesium halide represented by the general formula $R^1MgX$ (X is halogen atom), when $R^1$ is a hydrocarbon group, to yield the corresponding 1-alkyl-1-hydroxy-1,2,3,4-tetrahydronaphthalene, which is then dehydrated, or by submitting corresponding 1,2,3,4-tetrahydronaphthalen-1-one to a Bamford-Stevens reaction or reducing the carbonyl group to a hydroxy group, then dehydrating when $R^1$ is a hydrogen. $R^1$ represents a hydrogen atom or a hydrocarbon group containing from 1 to 7 carbon atoms such as methyl, ethyl, propyl, isopropyl, butyl, pentyl, hexyl, cyclopentyl, cyclohexyl, phenyl, benzyl, tolyl, allyl, vinyl, isopropenyl, ethynyl or the like. $R^2$, $R^3$, $R^4$ and $R^5$ each represents a member selected from the group consisting of a hydrogen atom, a hydrocarbon group containing from 1 to 7 carbon atoms such as methyl, ethyl, propyl, isopropyl, butyl, isobtuyl, pentyl, hexyl, cyclopentyl, cyclohexyl, phenyl, benzyl, tolyl, allyl, vinyl, ethynyl or the like, a hydroxy group, an alkoxy group containing from 1 to 7 carbon atoms such as methoxy, ethoxy, propoxy, isopropoxy, butoxy, pentyloxy, hexyloxy, cyclopentyloxy, cyclohexyloxy, phenoxy, benzyloxy, tolyloxy, allyloxy, vinyloxy, ethynyloxy or the like, or a halogen atom such as fluorine, chlorine, bromine or iodine. These compounds are exemplified as follows:

3,4-dihydronaphthalene
1-methyl-3,4-dihydronaphthalene
5-methyl-3,4-dihydronaphthalene
7-methyl-3,4-dihydronaphthalene
8-methyl-3,4-dihydronaphthalene
1,5-dimethyl-3,4-dihydronaphthalene
1,7-dimethyl-3,4-dihydronaphthalene
1,5,8-trimethyl-3,4-dihydronaphthalene
1,5,7,8-tetramethyl-3,4-dihydronaphthalene
1-ethyl-7-methyl-3,4-dihydronaphthalene
1-methyl-6-isopropyl-3,4-dihydronaphthalene
1-methyl-7-isopropyl-3,4-dihydronaphthalene
1,7-diethyl-3,4-dihydronaphthalene
1-butyl-3,4-dihydronaphthalene
5-methoxy-3,4-dihydronaphthalene
6-methoxy-3,4-dihydronaphthalene
7-methoxy-3,4-dihydronaphthalene
8-methoxy-3,4-dihydronaphthalene
1-methyl-5-methoxy-3,4-dihydronaphthalene
1-methyl-6-methoxy-3,4-dihydronaphthalene
1-methyl-7-methoxy-3,4-dihydronaphthalene
6,8-dimethoxy-3,4-dihydronaphthalene
1,7-dimethyl-5-methoxy-3,4-dihydronaphthalene
1,5-dimethyl-6-methoxy-3,4-dihydronaphthalene
1-methyl-5,6-dimethoxy-3,4-dihydronaphthalene
1-methyl-6,7-dimethoxy-3,4-dihydronaphthalene
1-methyl-6-ethoxy-3,4-dihydronaphthalene
6-isopropyl-7-methoxy-3,4-dihydronaphthalene
1,5-dimethyl-8-isopropyl-3,4-dihydronaphthalene
1-methyl-5-isopropyl-6-methoxy-3,4-dihydronaphthalene
1-methyl-6-isopropyl-7-methoxy-3,4-dihydronaphthalene
1-methyl-6-butoxy-3,4-dihydronaphthalene
1-methyl-6-cyclopentyloxy-3,4-dihydronaphthalene
1-ethyl-6-hydroxy-3,4-dihydronaphthalene
1-ethyl-6-methoxy-3,4-dihydronaphthalene
1-ethyl-6-ethoxy-3,4-dihydronaphthalene
1-ethyl-6-propoxy-3,4-dihydronaphthalene
1-ethyl-6-isopropoxy-3,4-dihydronaphthalene
1-ethyl-6-butoxy-3,4-dihydronaphthalene
1-ethyl-6-pentyloxy-3,4-dihydronaphthalene
1-ethyl-6-hexyloxy-3,4-dihydronaphthalene
1-ethyl-6-cyclopentyloxy-3,4-dihydronaphthalene
1-ethyl-6-cyclohexyloxy-3,4-dihydronaphthalene
1-ethyl-6-phenoxy-3,4-dihydronaphthalene
1-ethyl-6-benzyloxy-3,4-dihydronaphthalene
1-ethyl-6-p-tolyloxy-3,4-dihydronaphthalene
1-ethyl-6-allyloxy-3,4-dihydronaphthalene
1-ethyl-6-ethynyloxy-3,4-dihydronaphthalene
1-propyl-5,7,8-trimethyl-3,4-dihydronaphthalene
1-propyl-6-propoxy-3,4-dihydronaphthalene
1-propyl-6-cyclopentyloxy-3,4-dihydronaphthalene
1-propyl-6-vinyloxy-3,4-dihydronaphthalene
1-isopropyl-6-methoxy-3,4-dihydronaphthalene
1-isopropyl-6-ethoxy-3,4-dihydronaphthalene
1-butyl-6-methoxy-3,4-dihydronaphthalene
1-butyl-6-isopropoxy-3,4-dihydronaphthalene
1-butyl-6-benzyloxy-3,4-dihydronaphthalene
1-pentyl-6-hexyloxy-3,4-dihydronaphthalene
1-pentyl-6-allyloxy-3,4-dihydronaphthalene
1-hexyl-6-methoxy-3,4-dihydronaphthalene
1-hexyl-6-vinyloxy-3,4-dihydronaphthalene
1-cyclopentyl-6-butoxy-3,4-dihydronaphthalene
1-cyclopentyl-6-p-tolyloxy-3,4-dihydronaphthalene
1-cyclohexyl-3,4-dihydronaphthalene
1-cyclohexyl-6-methoxy-3,4-dihydronaphthalene
1-cyclohexyl-6-phenoxy-3,4-dihydronaphthalene
1-phenyl-3,4-dihydronaphthalene
1-phenyl-5-methoxy-3,4-dihydronaphthalene
1-phenyl-6-methoxy-3,4-dihydronaphthalene
1-phenyl-6,7-dimethoxy-3,4-dihydronaphthalene
1-phenyl-5,7,8-trimethyl-3,4-dihydronaphthalene
1-phenyl-6-isopropoxy-3,4-dihydronaphthalene
1-allyl-6-hydroxy-3,4-dihydronaphthalene
1-allyl-6-methoxy-3,4-dihydronaphthalene
1-allyl-6-ethoxy-3,4-dihydronaphthalene
1-vinyl-3,4-dihydronaphthalene
1-vinyl-6-methoxy-3,4-dihydronaphthalene
1-vinyl-6-pentyloxy-3,4-dihydronaphthalene
1-vinyl-6-cyclohexyloxy-3,4-dihydronaphthalene
1-vinyl-6-ethynyloxy-3,4-dihydronaphthalene
1-ethynyl-3,4-dihydronaphthalene 1-ethynyl-6-methoxy-3,4-dihydronaphthalene
1-ethynyl-6-benzyloxy-3,4-dihydronaphthalene
1-isopropenyl-3,4-dihydronaphthalene
1,7-diphenyl-3,4-dihydronaphthalene
1-methyl-5-hydroxy-8-methoxy-3,4-dihydronaphthalene
1,5,8-triethyl-3,4-dihydronaphthalene
1-ethyl-3,4-dihydronaphthalene
1-ethyl-5,8-dimethyl-3,4-dihydronaphthalene
1-ethyl-5,7-dimethyl-3,4-dihydronaphthalene
1-ethyl-5,7-dimethyl-8-methoxy-3,4-dihydronaphthalene
1-ethyl-7,8-dimethyl-5-methoxy-3,4-dihydronaphthalene
1-ethyl-5-methoxy-8-methyl-3,4-dihydronaphthalene
1-ethyl-5,7,8-trimethyl-3,4-dihydronaphthalene
1-methyl-5,8-diethyl-3,4-dihydronaphthalene
1-methyl-5-tolyl-3,4-dihydronaphthalene
1-methyl-7-vinyl-3,4-dihydronaphthalene
1,5-diethynyl-3,4-dihydronaphthalene
1-methyl-6-cyclohexyl-3,4-dihydronaphthalene
1-methyl-7-cyclopentyl-3,4-dihydronaphthalene
1-ethyl-5-hexyl-3,4-dihydronaphthalene
1-ethyl-8-allyl-3,4-dihydronaphthalene
1-ethyl-5-pentyl-3,4-dihydronaphthalene
1-tolyl-5-chloro-3,4-dihydronaphthalene
1-methyl-7-bromo-3,4-dihydronaphthalene
1-methyl-6,7-dimethoxy-5,8-dibromo-3,4-dihydro-
  naphthalene
1-ethyl-5-chloro-7,8-dimethoxy-3,4-dihydronaphthalene The peracid preferably used in the present invention is an organic peracid such as performic acid, peracetic acid, peroxytrifluoroacetic acid, perbenzoic acid, m-chloro- or p-nitroperbenzoic acid, monoperphthalic acid or the like. The distinctive feature of the present invention is that the reaction can steadily be carried out by adding a lower alkanol such as methanol, ethanol, propanol or the like into the reaction medium.

The general procedure of the reaction is constituted by two steps, that is, by oxidation with a peracid (the first step) and elimination of the alcohol molecule from the resulting ether intermediate (the second step). The reaction in the first step is carried out by dissolving the starting material in an alcohol such as methanol, ethanol, propanol or the like (when insoluble in an alcohol, an inert co-solvent, such as benzene, chloroform, dichloromethane, ether, dioxane or the mixture thereof, may be added), cooling to a low temperature, and then, after adding dropwise a peracid or the solution thereof with stirring, keeping the reaction medium at a low temperature with continuous stirring. In this case, although, when the alcohol content in the reaction medium is low, the result is unsatisfactory whereas when the alcohol content is increased to 50–70%, a good result is obtained. The oxidation reaction may be carried out at a low temperature ranging from −30 to 10° C., preferably at −10 to 5° C. Although the use of an excess of peracid does not produce a distinguishable effect, a small excess of the peracid agent (about 1.2 mole equivalent) in relation to the reaction material may preferably be used for economical reasons. Since the maintenance of peracid in a free state is generally difficult, a solution in a suitable organic solvent may be used according to the character of the peracid and the procedure used in the preparation thereof. For example, 0.3–1.2 moles/liter of perbenzoic acid in chloroform and 0.8–1.5 moles/liter of peracetic acid in glacial acetic acid may be used as the preferable peracid. The reaction, though proceeding rapidly in a short time, is preferably carried out with continuous stirring for 1–3 hours in order to complete the reaction. Treatment after the reaction in this step may be carried out by treating the reaction mixture with a reducing agent (e.g., sodium sulfite), pouring into ice-water or ice-cooled aqueous alkaline solution (e.g., sodium carbonate solution), and extracting with chloroform or dichloromethane, and then, if necessary, washing with a dilute alkaline solution (e.g., dilute sodium carbonate solution or dilute sodium hydroxide solution). In the case of peracetic acid or peroxytrifluoroacetic acid, containing a corresponding acid anhydride agent (oxidizing agent) owing to unavoidable circumstances in the preparation thereof, the particular treatment is necessary to obtain good results. The following procedures are advantageous in this case; that is, after the reaction, a solution of sodium hydroxide or potassium hydroxide or a large amount of ice-water is gradually added to the reaction mixture under cooling in order to destroy and neutralize the acid anhydride, then the product is extracted in the same procedure as described above; or after removing the acid anhydride as much as possible at a low temperature and a reduced pressure, the mixture is neutralized and extracted; or without after-treatment, the reaction is advanced to the next elimination reaction of the alcohol molecule. The intermediates (V) obtainable in this step are exemplified as follows:

1,6-dimethoxy-1-ethyl-1,2,3,4-tetrahydronaphthalen-2-ol
1,6-dimethoxy-1-butyl-1,2,3,4-tetrahydronaphthalen-2-ol
1,6-dimethoxy-1,2,3,4-tetrahydronaphthalen-2-ol
1,6-dimethoxy-1-methyl-1,2,3,4-tetrahydronaphthalen-2-ol
1-methoxy-6-methyl-1,2,3,4-tetrahydronaphthalen-2-ol
1-methoxy-1-methyl-1,2,3,4-tetrahydronaphthalen-2-ol
1,7-dimethoxy-1-methyl-1,2,3,4-tetrahydronaphthalen-2-ol
1,5-dimethoyx-1-methyl-1,2,3,4-tetrahydronaphthalen-2-ol
1,6-dimethoxy-1,5-dimethyl-1,2,3,4-tetrahydro-
  naphthalen-2-ol
1-methyl-1,6,7-trimethoxy-1,2,3,4-tetrahydro-
  naphthalen-2-ol
1,7-dimethoxy-6-isopropyl-1-methyl-1,2,3,4-tetrahydro-
  naphthalen-2-ol
5-chloro-1-ethyl-1,7,8-trimethoxy-1,2,3,4-tetrahydro-
  naphthalen-2-ol
1-ethoxy-1-ethyl-6-methoxy-1,2,3,4-tetrahydro-
  naphthalen-2-ol
1-ethyl-6-methoxy-1-propoxy-1,2,3,4-tetrahydro-
  naphthalen-2-ol.

The reaction in the second step is the elimination of alcohol molecule of the resulting ether derivative (V). The reaction is carried out by heating the ether derivative in a solvent or without a solvent at 50 to 200° C. in the presence of an acid catalyst. For example, the ether derivative (V), dissolving in a hydrous or anhydrous solvent, such as an alcohol (e.g., methanol, ethanol, etc.), dioxane, tetrahydrofuran, acetone or the like, is heated, e.g., at the refluxing temperature of the said solvent in the presence of an acid catalyst such as hydrochloric acid, sulfuric acid, p-toluene sulfonic acid, potassium bisulfate or the like. The reaction is also carried out by distilling the ether derivative at reduced pressure in the presence of an acid catalyst such as hydrochloric acid, sulfuric acid, p-toluene sulfonic acid, potassium bisulfate or the like. In the case of the distillation in the presence of an acid catalyst, the reaction temperature is 130–170° C., preferably 140–160° C. and the amount of catalyst used is below 0.3% and more preferably 0.1%. It is noteworthy that the presence of an excess of catalyst or the use of catalyst having an oxidizing character or easily accompanying by oxidizing impurities (e.g., hydrochloric acid) causes the side-reactions, such as complicated oxidation, aromatization, etc. After reacting with an acid catalyst, the reaction product is taken out by distillation at reduced pressure, or by the extraction procedure, or by adding an alkali such as sodium acetate into the reaction mixture to neutralize and then extracting the reaction product. When the reaction is advanced to the alcohol elimination reaction step without treatment atfer oxidation, the treatment is carried out by pouring the reaction mixture into ice-water or ice-cooled dilute alkaline solution and extracting the product with a suitable solvent such as chloroform, dichloromethane, benzene, ether or the like, or by adding directly a solid alkali such as sodium hydroxide or potassium hydroxide into the reaction mixture to neutralize and then extracting.

The purification of the reaction product is, for example, achieved by formation of a semicarbazone according to the usual manner. The reaction, for example, is carried out by reacting the product with semicarbazide hydrochloride in an alcohol such as methanol, ethanol etc. in the presence of sodium acetate as the catalyst. Hydrolysis of the semicarbazide is performed in the usual manner, in particular, by the catalytic acid hydrolysis in a heterogeneous medium consisting of benzene and dilute hydrochloric acid.

The previous methods possess difficult points in that, since acid is released in the second step, attention must be paid in the distillation procedure, and particularly, in the use of an aromatic peracid such as perbenzoic acid, the distillation is strikingly disturbed by the sublimate. But such inconveniences have been removed in the present invention.

The 2-tetralone derivatives prepared in the present invention are essential intermediates useful in the preparation of phenanthrene derivatives represented by the formula:

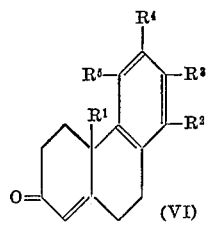

(VI)

(wherein $R^1$, $R^2$, $R^3$, $R^4$ and $R^5$ each has the same significance as designated above) which are useful, by virtue of their antiandrogenic action, inter alia in the treatment of virilism in any of the various aspects thereof. The compounds (VI) are also useful for concomitant administration with other medicaments which are indicated for a particular purpose but which concomitantly exert an undesired androgenic action. The employed compounds (VI), however, suppress the undesired androgenic action. Administration is in the usual way, e.g., orally by way of tablets, as well as in other ways. Moreover, the compounds of the present invention are useful as intermediates in the preparation of steroid hormones.

The starting materials used in the present invention were found to be approximately 90% pure as revealed by an examination by gas chromatography and the yields of the end products are calculated according to these results.

EXAMPLE 1

To a solution of 18.8 g. of 1-ethyl-6-methoxy-3,4-dihydronaphthalene in 190 ml. of methanol at −3 to 2° C. is added dropwise 97.5 ml. of 1.24 M (concentration)-peracetic acid solution with stirring over a 40 min. period. After stirring for an additional 230 min. at the same temperature, there is added 25 ml. of 20% aqueous sodium sulfite solution below 5° C. to decompose an excess of peracid and the peroxide. The reaction mixture is cooled at −10° C. and to the solution is slowly added dropwise 140 ml. of 50% sodium hydroxide solution under vigorous stirring during which time, since the inner temperature rises readily accompanied by the exothermic reaction, the reaction mixture must be cooled with care. After standing overnight at room temperature, the reaction mixture is extracted with chloroform, washed with water and dried over anhydrous sodium sulfate. The solvent is distilled off in vacuo to give 24.6 g. of oily residue. The residue is dissolved in 160 ml. of methanol and to the solution is added 30 ml. of 2 N-sulfuric acid, and the mixture is then refluxed for 30 min. Water is added and the product is extracted with ether, and the extract is washed with water, dried over anhydrous sodium sulfate, and then evaporated in vacuo to give 20 g. of tetralone as a crude material, which is immediately dissolved in 70 ml. of methanol. The resulting solution is treated with a mixture consisting of 13.4 g. of semicarbazide hydrochloride, 9.8 g. of sodium acetate, and 20 ml. of water under refluxing for 30 min. The reaction mixture is evaporated in vacuo, diluted with water, and then allowed to stand overnight at room temperature. The filtration of the precipitated crystal gives 23.2 g. of semicarbazone having an M.P. of 183–185° C. (99.2% yield).

IR: $\nu_{Nujol}^{max}$ 3474, 3218 (—NH—CO—NH$_2$), 1688 (—CO—NH$_2$), 1618 (>C=N—), 1583, 1501 (anisole) cm.$^{-1}$ Analysis.—Calcd. for $C_{14}H_{19}O_2N_3$ (percent): C, 64.34; H, 7.33; N, 16.08. Found (percent): C, 64.43; H, 7.49; N, 16.03.

EXAMPLE 2

To a solution of 9.4 g. of 1-ethyl-6-methoxy-3,4-dihydronaphthalene in 95 ml. of methanol at 0–5° C. is added dropwise 48.8 ml. of 1.24 M (concentration)-peracetic acid solution with stirring over a 40 min. period. After stirring for an additional 180 min. at the same temperature, there is added 12.5 ml. of 20% aqueous sodium sulfite solution at −5° C. After standing at room temperature for a short time, the reaction mixture is concentrated to ½ volume at reduced pressure below 40° C. To the residual reaction mixture, cooled below 5° C., is slowly added dropwise 50 ml. of 50% aqueous sodium hydroxide solution, then allowed to stand overnight at room temperature. The reaction mixture is poured in icewater, extracted with chloroform, washed with water, dried over anhydrous sodium sulfate, and evaporated in vacuo to give 11.8 g. of oily residue. The residue in 80 ml. of methanol is treated with 15 ml. of 2 N-sulfuric acid under refluxing for 20 min., and then treated in the same procedure as Example 1 to give 11.4 g. of tetralone as crude material, which is immediately dissolved in 35 ml. of methanol. The resulting solution is refluxed with 6.7 g. of semicarbazide hydrochloride, 4.9 g. of sodium acetate, and 10 ml. of water for 30 min. Treatment in accordance with the procedure of Example 1 gives 10.8 g. of semicarbazone (91.8% yield).

EXAMPLE 3

According to the procedure of Example 2, 9.4 g. of 1-ethyl-6-methoxy-3,4 ̱ dihydronaphthalene is oxidized, and there is added 16.7 ml. of 15% sodium sulfite solution at −8° C., and then allowed to stand for a short time with stirring. To this reaction mixture is added 25 ml. of 2 N-sulfuric acid and the solution is heated at 60–70° C. for 30 min., and then concentrated to ¼ volume at reduced pressure below 50° C. The mixture is extracted with chloroform, washed with 2 N-sodium carbonate and then with water, dried over anhydrous sodium sulfate, and evaporated in vacuo to give 10.15 g. of tetralone as crude material, which is reacted with semicarbazide in accordance with the procedure of Example 1 to give 9.9 g. of semicarbazone (84.4 percent yield).

EXAMPLE 4

To a solution of 18.8 g. of 1-ethyl-6-methoxy-3,4-dihydronaphthalene in 270 ml. of methanol at 0–4° C. is added dropwise 220 ml. of 0.547 M-perbenzoic acid-chloroform solution with stirring over a 35 min. period. After stirring for an additional 150 min. at 0–2° C., the reaction mixture is poured in ice-cooled 2N-sodium carbonate solution, and the product is extracted with methylene chloride. The extract is washed with 2 N-sodium carbonate solution and then with water, dried over anhydrous sodium sulfate, and evaporated in vacuo to give 23.1 g. of oily residue. The residue in 180 ml. of methanol is treated with 36 ml. of 2 N-sulfuric acid for 20 min., under refluxing. After cooling, the reaction mixture is poured in ice-water and the product is extracted with methylene chloride, and treated in the usual manner to give 20.3 g. of oily residue, which is reacted with semicarbazide in accordance with the procedure of Example 1 to give 19.2 g. of semicarbazone as a crystal (81.9% yield).

EXAMPLE 5

To a solution of 18.8 g. of 1-ethyl-6-methoxy-3,4-dihydronaphthalene in 300 ml. of methanol at 0–5° C. is added dropwise 222 ml. of 0.542 M-perbenzoic acid-chloroform solution with stirring over a 35 min. period. After stirring for an additional 40 min. at the same temperature, the reaction mixture is poured in 1 l. of ice-water and the product is extracted with chloroform. The extract is washed with 2 N-sodium carbonate solution and then with water, dried over anhydrous sodium sulfate, and evaporated in vacuo to give 26.7 g. of yellow oily residue, which is distilled at reduced pressure (0.35 mm. of Hg) at 140–160° C. on oil bath temperature in the presence of 70 mg. of potassium bisulfate. During this time, methanol, generated first by the elimination reaction, is distilled off into a trap cooled by Dry Ice-acetone and then a yellow oily material as the main fraction is collected by the successive distillation. The resulting distillate (19.14 g.), having a B.P.$_{0.35}$ of 108–121° C., dissolved in 70 ml. of methanol, is reacted with semicarbazide in accordance with the procedure of Example 1 to give 19.75 g. of semicarbazone as a crystal (84.0% yield).

A suspension of 275.8 g. of above-described 1-ethyl-6 - methoxy - 1,2,3,4 - tetrahydronaphthalen - 2 - one semicarbazone in a two phase mixture consisting of 2.37 l. of 1 N-hydrochloric acid and 1 l. of benzene is refluxed for 70 min. with stirring, during which time, the crystal is almost dissolved in the benzene layer and then turns orange in color. After cooling, the combined organic phase is washed with water, dried over anhydrous sodium sulfate and evaporated in vacuo to give 232 g. of brown oily material, which, on distillation, yields 202.63 g. of 1 - ethyl - 6 - methoxy - 1,2,3,4 - tetrahydronaphthalen-2-one having a B.P.$_{0.6}$ of 130–135° C. (94% yield).

IR: $\nu_{max}^{CCl_4}$ 1719 (CO), 1613, 1581, 1503, 1269 (anisole) cm.$^{-1}$

Analysis.—Calcd. for $C_{13}H_{16}O_2$: C, 76.44; H, 7.90. Found: C, 75.75; H, 7.74.

EXAMPLE 6

According to the procedure of Example 5, 15 g. of 1-butyl-5-methoxy-3,4-dihydronaphthalene is oxidized with perbenzoic acid and the product is distilled at reduced pressure in the presence of potassium bisulfate to yield 15.5 g. of 1-butyl-6-methoxy-1,2,3,4-tetrahydronaphthalen-2-one, having a B.P.$_{0.06}$ of 135–145° C., which, via the purification of semicarbazone in the same manner as described above, gives 15.1 g. of pure substance having a B.P.$_{0.06}$ of 130–135° C. (85% yield).

IR: $\nu_{max}^{CCl_4}$ 1715, 1605, 1580, 1500, 1270, 1040 cm.$^{-1}$

EXAMPLE 7

According to the same procedure as Example 5, 7.8 g. of 6-methoxy-3,4-dihydronaphthalene is oxidized with perbenzoic acid and the product is distilled at reduced pressure in the presence of potassium bisulfate to yield 8.6 g. of distillate, having a B.P.$_{0.2}$ of 160–200° C., which is redistilled at the reduced pressure to give 7.7 g. of 6 - methoxy - 1,2,3,4 - tetrahydronaphthalen - 2 - one having a B.P.$_{0.9}$ of 124–124.5° C. and as needles having an M.P. of 34–35° C. under cooling (98.3% yield).

UV: $\lambda_{max}^{EtOH}$ 279 m$\mu$ ($\epsilon$ 2710)

Analysis.—Calcd. for $C_{11}H_{12}O_2$ (percent): C, 74.97; H, 6.86. Found (percent): C, 74.98; H, 6.95.

EXAMPLE 8

According to the procedure of Example 1, 17.4 g. of 1-methyl-6-methoxy-3,4-dihydronaphthalene is oxidized with peracetic acid and eliminated an alcohol molecule and then followed by the formation of semicarbazone derivative to yield 23.2 g. of 1-methyl-6-methoxy-1,2,3,4-tetrahydronaphthalen-2-one semicarbazone having an M.P. of 212–214° C. (quantitative yield).

EXAMPLE 9

According to the procedure of Example 8, 5.6 g. of 1-methyl-6-methoxy-3,4-dihydronaphthalene is oxidized with peracetic acid to yield an oily oxide (ether form intermediate: 6.8 g.), which is crystallized from ether-pentane to yield 4.2 g. of the trans-isomer (regarding to 1-methoxy group and 2-hydroxy group) of 1-methyl-1,6-dimethoxy - 2 - hydroxyl - 1,2,3,4 - tetrahydronaphthalene having an M.P. of 80–81° C.

IR: $\nu_{max}^{CCl_4}$ 3588 cm.$^{-1}$

NMR: $\tau$ 8.69 (1–CH$_3$), 7.01 (1–OCH$_3$), 6.26 (6–OCH$_3$), 5.91 (quartet, J=4.5, J=10.5; 2–H).

Analysis.—Calcd. for $C_{13}H_{18}O_3$ (percent): C, 70.24; H, 8.16. Found (percent): C, 70.20; H, 8.36.

Neutral alumina chromatography of the mother liquid of recrystallization gives an additional 0.8 g. of the same crystal and furthermore the elution from pentane-benzene yields 1.0 g. of cis-isomer as an amorphous.

IR: $\nu_{max}^{CCl_4}$ 3563 cm.$^{-1}$

NMR: $\tau$ 8.52 (1–CH$_3$), 6.82 (1–OCH$_3$), 6.25 (6–OCH$_3$), 6.30 (quartet, J=4.5, J=10.5; 2–H).

Analysis.—Calcd. for $C_{13}H_{18}O_3$ (percent): C, 70.24; H, 8.16. Found (percent): C, 69.94; H, 8.20.

Each 1.0 g. of the resulting cis- and trans-isomers dissolved in 30 ml. of pyridine, is treated with 1.67 g. of p-nitrobenzoyl chloride. After standing overnight at room temperature, the reaction mixture is treated in the usual manner to give a corresponding p-nitrobenzoate.

Trans-p-nitrobenzoate; M.P. 161–164° C. (recrystallized from acetone).

IR: $\nu_{max}^{KBr}$ 1722, 1616, 1590, 1276, 1121 cm.$^{-1}$

Analysis.—Calcd. for $C_{20}H_{21}NO_6$ (percent): C, 64.68; H, 5.70; N, 3.77. Found (percent): C, 64.70; H, 5.88; N, 3.98.

Cis-p-nitrobenzoate; M.P. 116–117° C. (recrystallized from ether-acetone).

IR: $\nu_{max}^{KBr}$ 1726, 1609, 1575, 1275, 1122 cm.$^{-1}$

Analysis.—Calcd. for $C_{20}H_{21}NO^6$ (percent): C, 64.68; H, 5.70; N, 3.77. Found (percent): C, 64.39; H, 5.92; N, 3.86.

Each isomer of the p-nitrobenzoates in methanol is hydrolyzed with potassium carbonate in the usual manner to give a corresponding 1-methyl-1,6-dimethoxy-2-hydroxy - 1,2,3,4 - tetrahydronaphthalene (trans-isomer: 80–81° C. cis-isomer: oil).

EXAMPLE 10

According to the procedure of Example 1, 24.0 g. of 6-methyl-3,4-dihydronaphthalene is oxidized with peracetic acid and an alcohol molecule eliminated, followed by the formation of a semicarbazone derivative, which is recrystallized from ethanol to give 30.0 g. of 6-methyl-1,2,3,4-tetrahydronaphthalen-2-one semicarbazone having an M.P. of 190° C. (92% yield).

In the same manner, the following compounds are prepared: 1 - methyl - 1,2,3,4 - tetrahydronaphthalen - 2 - one semicarbazone (M.P. 200–202° C.; 93.5% yield) from 1 - methyl - 3,4 - dihydronaphthalene; 1 - methyl-7 - methoxy - 1,2,3,4 - tetrahydronaphthalen - 2 - one semicarbazone (M.P. 191–192° C.; 88.7% yield) from 1 - methyl - 7 - methoxy - 3,4 - dihydronaphthalene; 1-methyl - 5 - methoxy - 1,2,3,4 - tetrahydronaphthalen-2-one semicarbazone (M.P. 188–190° C.; 96.7% yield) from 1 - methyl - 5 - methoxy - 3,4 - dihydronaphthalene; 1,5 - dimethyl - 6 - methoxy - 1,2,3,4 - tetrahydronaphthalen-2-one semicarbazone (M.P. 188° C.; 89.1% yield) from 1,5 - dimethyl - 6 - methoxy - 3,4 - dihydronaphthalene; 1 - methyl - 6,7 - dimethoxy - 1,2,3,4 - tetrahydronaphthalen-2-one semicarbazone (M.P. 200° C., decomp.; 87.6% yield) from 1 - methyl - 6,7 - dimethoxy-3,4 - dihydronaphthalene; 1 - methyl - 6 - isopropyl - 7-methoxy - 1,2,3,4 - tetrahydronaphthalen - 2 - one semicarbazone (M.P. 184–187° C.; 88.1% yield) from 1-methyl - 6 - isopropyl - 7 - methoxy - 3,4 - dihydronaphthalene; 1 - ethyl - 5 - chloro - 7,8 - dimethoxy - 1,2,3,4-tetrahydronaphthalen - 2 - one semicarbazone (M.P. 219–220° C.; 81.5% yield) from 1 - ethyl - 5 - chloro-7,8 - dimethoxy - 1,2,3,4 - tetrahydronaphthalene.

What is claimed is:

1. A process for the preparation of naphthalene derivatives which comprises oxidizing a dihydronaphthalene derivative represented by the Formula I wherein $R^1$ is a member selected from the group consisting of a hydrogen atom and a hydrocarbon group containing from 1 to 7 carbon atoms; $R^2$, $R^3$, $R^4$ and $R^5$ each is a member selected from the group consisting of a hydrogen atom, a hydrocarbon group containing from 1 to 7 carbon atoms, a hydroxy group, an alkoxy group containing from 1 to 7 carbon atoms, and a halogen atom with a peracid derived from a corresponding carboxylic acid in a reaction medium containing 50–70% of a lower alkanol at −30 to 10° C. and then eliminating an alcohol molecule under heating at 50 to 200° C. in the presence of less than 0.3% of an acid catalyst selected from the group consisting of hydrochloric acid, sulfuric acid, p-toluenesulfonic acid, and potassium bisulfate, to yield a 2-tetralone derivative represented by the Formula II wherein $R^1$, $R^2$, $R^3$, $R^4$ and $R^5$ each has the same significance as designated above, said Formulas I and II being represented as follows:

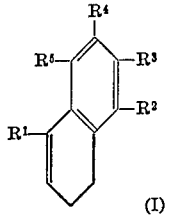 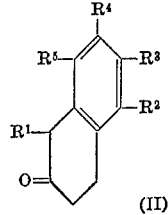

2. The process according to claim 1, wherein the oxidation is carried out at −10 to 5° C.

3. The process according to claim 1, wherein the lower alcohol used in the peracid oxidation is selected from the group consisting of methanol, ethanol and propanol.

4. The process according to claim 1, wherein the peracid used in the oxidation is selected from the group consisting of performic acid, peracetic acid, peroxytrifluoroacetic acid, perbenzoic acid, m-chloroperbenzoic acid, p-nitroperbenzoic acid and monoperphthalic acid.

5. The process according to claim 1, wherein the elimination reaction of alcohol molecule by heating in a solvent is carried out at refluxing temperature of the solvent used.

6. The process according to claim 1, wherein the elimination reaction of alcohol molecule by distillation is carried out at 140 to 160° C.

7. The process according to claim 1, wherein the amount of an acid catalyst in the elimination reaction of alcohol molecule by distillation is below 0.1%.

References Cited
UNITED STATES PATENTS

| | | | |
|---|---|---|---|
| 2,223,664 | 12/1940 | Salzer | 200—590 |
| 2,720,542 | 10/1955 | Newhall | 260—613(D)X |

OTHER REFERENCES

Eastham et al., Jour. Amer. Chem. Soc., vol. 80 (1958), pp. 2887–2893.

DANIEL D. HORWITZ, Primary Examiner

U.S. Cl. X.R.

260—613, 348.5, 610